United States Patent
Bane

(10) Patent No.: US 12,203,562 B1
(45) Date of Patent: Jan. 21, 2025

(54) METHOD TO TEMPORARILY LOCK OPEN A SAFETY VALVE AND SYSTEM

(71) Applicant: Baker Hughes Oilfield Operations LLC, Houston, TX (US)

(72) Inventor: Darren Bane, Tomball, TX (US)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 0 days.

(21) Appl. No.: 18/491,938

(22) Filed: Oct. 23, 2023

(51) Int. Cl.
*F16K 35/02* (2006.01)
*E21B 34/06* (2006.01)

(52) U.S. Cl.
CPC ............ *F16K 35/022* (2013.01); *E21B 34/06* (2013.01)

(58) Field of Classification Search
CPC ............................... E21B 34/06; F16K 35/022
See application file for complete search history.

(56) References Cited

U.S. PATENT DOCUMENTS

| | | | | | |
|---|---|---|---|---|---|
| 4,619,320 | A | * | 10/1986 | Adnyana | E21B 34/06 166/66.7 |
| 5,040,283 | A | * | 8/1991 | Pelgrom | F16L 55/163 29/402.09 |
| 5,079,920 | A | * | 1/1992 | Whitehead | F03G 7/065 60/527 |
| 6,684,958 | B2 | * | 2/2004 | Williams | E21B 43/105 166/321 |
| 6,902,006 | B2 | * | 6/2005 | Myerley | E21B 34/102 166/373 |
| 7,137,452 | B2 | * | 11/2006 | McVicker | E21B 34/102 166/373 |
| 7,204,313 | B2 | * | 4/2007 | Williams | E21B 34/101 166/324 |
| 7,347,268 | B2 | * | 3/2008 | Layton | E21B 23/04 166/332.1 |
| 7,347,269 | B2 | * | 3/2008 | Layton | E21B 23/04 166/332.1 |
| 7,717,185 | B2 | * | 5/2010 | Anderson | E21B 34/102 166/332.8 |
| 7,909,088 | B2 | * | 3/2011 | O'Malley | E21B 34/08 166/319 |
| 7,938,923 | B2 | * | 5/2011 | Hood | B29C 65/48 156/95 |
| 7,971,651 | B2 | * | 7/2011 | Tanju | E21B 34/066 166/373 |

(Continued)

*Primary Examiner* — Aaron L Lembo
(74) *Attorney, Agent, or Firm* — CANTOR COLBURN LLP

(57) ABSTRACT

A method for temporarily locking open a safety valve, including displacing a flow tube comprising a shape memory material into interfering relationship with a flapper of the safety valve, thereby opening the flapper, disposing a dimpling tool in the flow tube, dimpling the flow tube, and applying a change signature to the shape memory material to remove the dimple, and return function to the flow tube. A safety valve with temporary lock open construction including a housing, a flapper articulated to the housing, and a flow tube including a shape memory material disposed in the housing and movable to a position where the flapper is closable and a position where the flapper is open. A wellbore system, including a borehole in a subsurface formation, a string in the borehole, and a safety valve disposed within or as a part of the string.

18 Claims, 3 Drawing Sheets

(56) References Cited

U.S. PATENT DOCUMENTS

| | | | | |
|---|---|---|---|---|
| 7,971,652 B2* | 7/2011 | Tanju | ............... | E21B 34/14 |
| | | | | 251/339 |
| 8,056,618 B2* | 11/2011 | Wagner | ............... | F16K 39/024 |
| | | | | 166/57 |
| 8,439,118 B2* | 5/2013 | Myerley | ............... | E21B 34/06 |
| | | | | 251/303 |
| 8,960,298 B2* | 2/2015 | Hill, Jr. | ............... | E21B 34/102 |
| | | | | 166/332.8 |
| 9,416,624 B2* | 8/2016 | Williamson | ............... | E21B 34/063 |
| 9,938,797 B2* | 4/2018 | MacDonald | ............... | E21B 17/02 |
| 9,999,920 B2* | 6/2018 | Xu | ............... | B23K 1/0008 |
| 2006/0048936 A1* | 3/2006 | Fripp | ............... | E21B 34/066 |
| | | | | 166/244.1 |
| 2008/0264647 A1* | 10/2008 | Li | ............... | E21B 33/1208 |
| | | | | 166/373 |
| 2009/0032237 A1* | 2/2009 | Bane | ............... | E21B 34/10 |
| | | | | 166/53 |
| 2009/0151924 A1* | 6/2009 | Lake | ............... | F16K 31/002 |
| | | | | 166/332.8 |

* cited by examiner

METHOD TO TEMPORARILY LOCK OPEN A SAFETY VALVE AND SYSTEM

BACKGROUND

In the resource recovery and fluid sequestration industries, safety valves are often used. In general, such valves are fail safe valves that are not locked in an open position. In some cases though during construction or reconditioning of the well, it may be beneficial to lock open a safety valve so that other tools can pass therethrough. This has been done with lock open sleeves that are temporary in nature but also cause a reduction in ID (inside diameter) which reduces the diameter of tools that may pass therethrough. Alternatively, the full ID of a flow tube may be accessed with the valve in a locked open position by dimpling the flow tube but this comes at the price of permanency. Specifically, dimpling the flow tube will permanently lock open the safety valve such that its function will require replacement in one way or another. The art would benefit from alternatives.

SUMMARY

An embodiment of a method for temporarily locking open a safety valve, including displacing a flow tube comprising a shape memory material into interfering relationship with a flapper of the safety valve, thereby opening the flapper, disposing a dimpling tool in the flow tube, dimpling the flow tube, and applying a change signature to the shape memory material to remove the dimple, and return function to the flow tube.

An embodiment of a safety valve with temporary lock open construction including a housing, a flapper articulated to the housing, and a flow tube including a shape memory material disposed in the housing and movable to a position where the flapper is closable and a position where the flapper is open.

An embodiment of a wellbore system, including a borehole in a subsurface formation, a string in the borehole, and a safety valve disposed within or as a part of the string.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
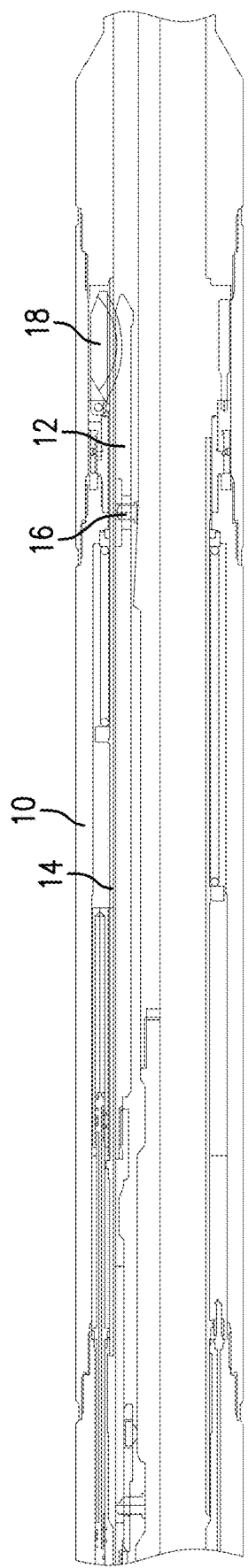
FIG. 1 is an extended sectional view of a safety valve and dimpling tool of the prior art.

Referring to FIG. 1, a prior art safety valve 10 and dimpling tool 12 are illustrated. Such tools are commercially available from Baker Hughes, Houston Texas under product family number H82283, for example. The dimpling tool 12 when actuated, creates an outwardly extending dimple in a flow tube 14 by a dimple punch 16. There may be one or more dimples that are made in the flow tube 14 such as at 120 degrees, 90 degrees, etc. After having made the dimples, the flow tube 12 is permanently fixed relative to the balance of the safety valve 10 and since it will be dimpled when a flapper 18 of the safety valve 10 is open, the valve 10 is rendered permanently open. While this is effective in locking the valve 10 open and provides for a maximum of available drift diameter for running subsequent tools through the permanently opened safety valve 10, it also necessitates that if the function of the safety valve 10 is needed in the future, that function must be replaced by a tubing retrievable safety valve or other means.

Figure 2:
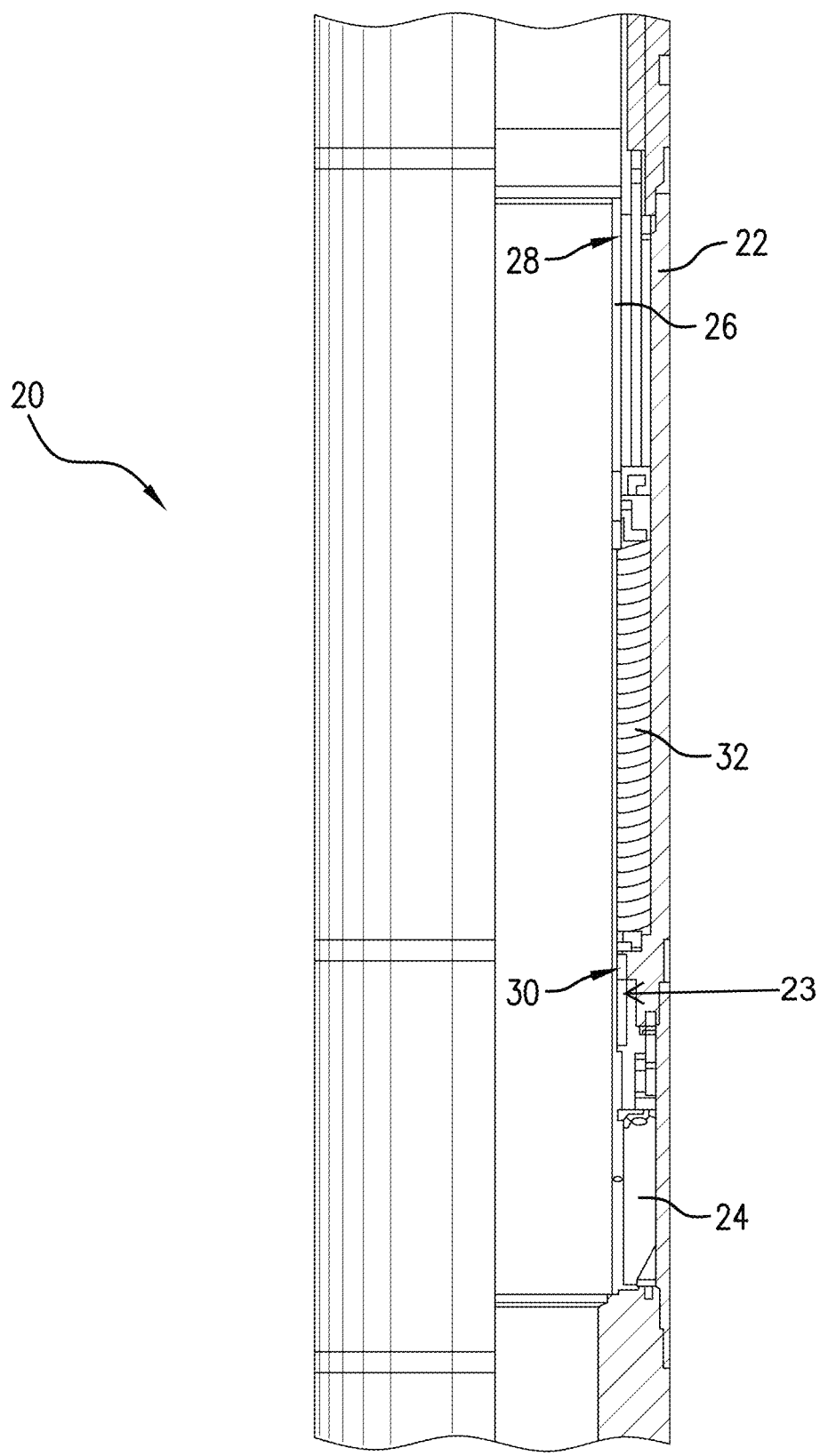
FIG. 2 is a sectional view of a safety valve as disclosed herein.

Referring to FIG. 2, a safety valve 20 according to the present disclosure, overcomes the drawbacks of the prior art by enabling a method for locking open a safety valve when needed and yet restoring the functionality of that original safety valve when desired. Valve 20 includes a housing 22, a flapper 24 articulated to the housing 22 and a flow tube 26 disposed within the housing 22 that is translatable between positioned where the flapper 24 may close and where the flapper 24 is prevented from closing. The flow tube 26 comprises a shape memory material at least in the places contemplated for dimpling. These places are those where a housing 22 structure or seal 3 is disposed within 0.125 inch radially of the flow tube 26. Such places are illustrated with arrows 28 and 30 in FIG. 2. Due to the proximity of a housing structure, the dimple will place material from the flow tube 26 in interference with that structure and thereby prevent the flow tube returning to its unactuated position based upon impetus from the power spring 32. Either of the positions illustrated with 28 or 30 will be sufficient to lock the valve 20. This is similar to the prior art. However, due to the construction of the flow tube 26, the dimpling process is reversible. This was not heretofore possible. According to the present disclosure, the shape memory material, whether that be at locations 28 and or 30 or the flow tube 26 may be completely formed from the shape memory material, the material is trained to respond to a change signature that will cause that material to return to its undimpled condition upon the occurrence of the trigger. Triggers include a thermal signature, a chemical signature or a pH signature, to name a few. Other shape memory signatures are contemplated and may be substituted.

The inventive safety valve 20 and the method for temporarily locking open a safety valve are enabled by the provision of the flow tube 26 as described.

Figure 3:
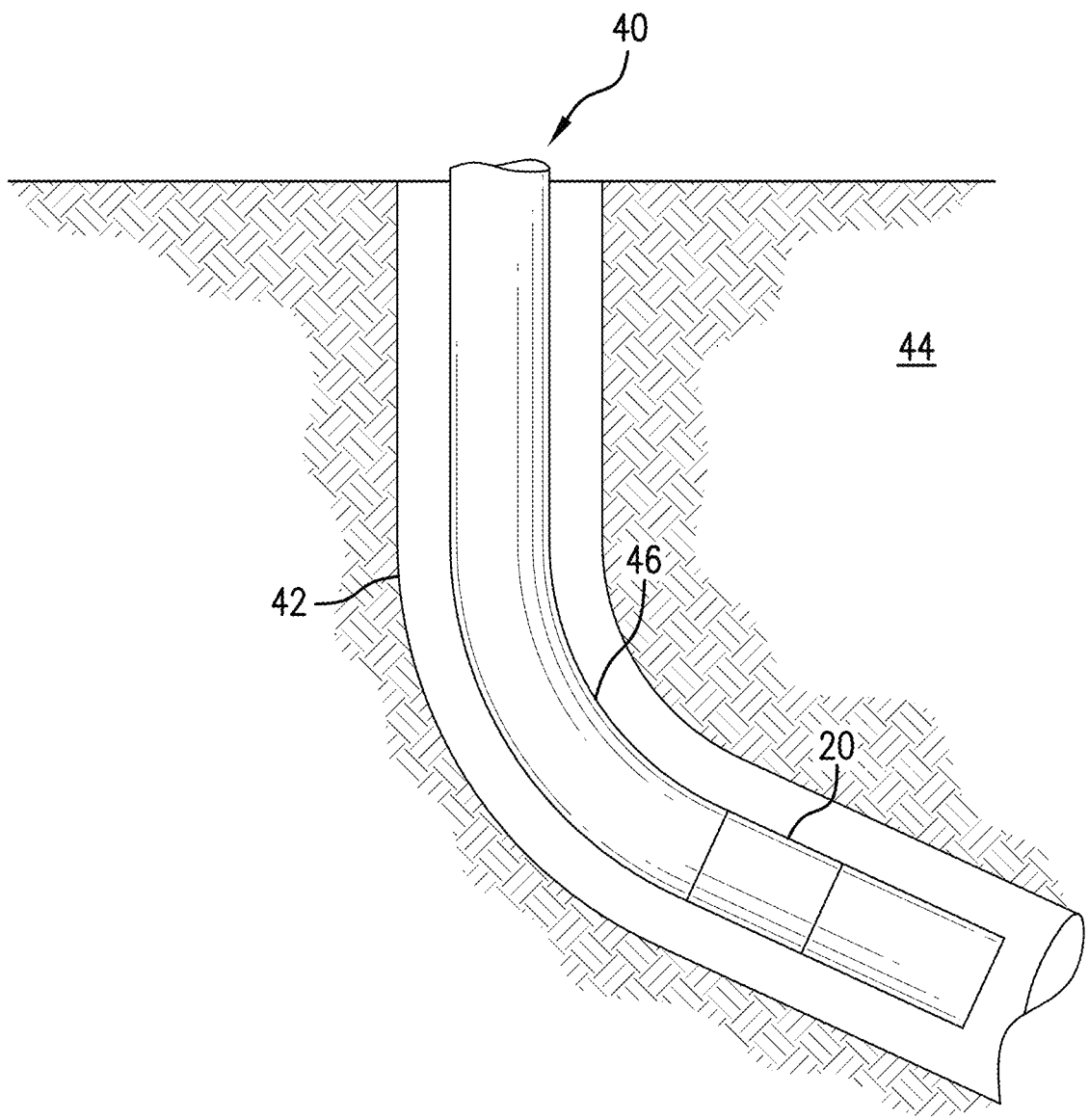
FIG. 3 is a view of a wellbore system including a safety valve as disclosed herein.

Referring to FIG. 3, a borehole system 40 is illustrated. The system 40 comprises a borehole 42 in a subsurface formation 44. A string 46 is disposed within the borehole 42. A safety valve 20 with temporary lock open construction as disclosed herein is disposed within or as a part of the string 46.

Set forth below are some embodiments of the foregoing disclosure:

Embodiment 1: A method for temporarily locking open a safety valve, including displacing a flow tube comprising a shape memory material into interfering relationship with a flapper of the safety valve, thereby opening the flapper, disposing a dimpling tool in the flow tube, dimpling the flow tube, and applying a change signature to the shape memory material to remove the dimple, and return function to the flow tube.

Embodiment 2: The method as in any prior embodiment, wherein the disposing the dimpling tool is prior to running.

Embodiment 3: The method as in any prior embodiment, wherein the disposing the dimpling tool is after running the safety valve.

Embodiment 4: The method as in any prior embodiment, wherein the dimpling is at a point of the flow tube that is located downstream of a structure radially outwardly of the flow tube that is less than about 0.125 inch from the flow tube.

Embodiment 5: The method as in any prior embodiment, wherein the structure is a seal.

Embodiment 6: The method as in any prior embodiment, wherein the change signature is a specified thermal signature.

Embodiment 7: The method as in any prior embodiment, wherein the change signature is a contact condition.

Embodiment 8: The method as in any prior embodiment, wherein the contact condition is an actuator chemical.

Embodiment 9: The method as in any prior embodiment, wherein the contact condition is pH.

Embodiment 10: The method as in any prior embodiment, wherein the dimpling physically prevents the flow tube from moving out of the interfering relationship with the flapper, thereby preventing flapper closure.

Embodiment 11: The method as in any prior embodiment, further including treating the flow tube to have a shape memory condition that is tubular.

Embodiment 12: A safety valve with temporary lock open construction including a housing, a flapper articulated to the housing, and a flow tube including a shape memory material disposed in the housing and movable to a position where the flapper is closable and a position where the flapper is open.

Embodiment 13: The valve as in any prior embodiment, wherein the shape memory material makes up a portion of the flow tube located downstream of a structure of the housing that is within 0.125 inch radially of the flow tube.

Embodiment 14: The valve as in any prior embodiment, wherein the shape memory material is responsive to a shape change trigger to return to a nondeformed condition after deformation by a dimpling tool.

Embodiment 15: The valve as in any prior embodiment, wherein the shape change trigger is a thermal signature.

Embodiment 16: The valve as in any prior embodiment, wherein the shape change trigger is a chemical signature.

Embodiment 17: The valve as in any prior embodiment, wherein the shape change trigger is a pH signature.

Embodiment 18: A wellbore system, including a borehole in a subsurface formation, a string in the borehole, and a safety valve as in any prior embodiment disposed within or as a part of the string.

The use of the terms "a" and "an" and "the" and similar referents in the context of describing the invention (especially in the context of the following claims) are to be construed to cover both the singular and the plural, unless otherwise indicated herein or clearly contradicted by context. Further, it should be noted that the terms "first," "second," and the like herein do not denote any order, quantity, or importance, but rather are used to distinguish one element from another. The terms "about", "substantially" and "generally" are intended to include the degree of error associated with measurement of the particular quantity based upon the equipment available at the time of filing the application. For example, "about" and/or "substantially" and/or "generally" can include a range of ±8% of a given value.

The teachings of the present disclosure may be used in a variety of well operations. These operations may involve using one or more treatment agents to treat a formation, the fluids resident in a formation, a borehole, and/or equipment in the borehole, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A method for temporarily locking open a safety valve, comprising:
   displacing a flow tube comprising a shape memory material into interfering relationship with a flapper of the safety valve, thereby opening the flapper;
   disposing a dimpling tool in the flow tube;
   dimpling the flow tube; and
   applying a change signature to the shape memory material to remove the dimple, and return function to the flow tube.

2. The method as claimed in claim 1, wherein the disposing the dimpling tool is prior to running.

3. The method as claimed in claim 1, wherein the disposing the dimpling tool is after running the safety valve.

4. The method as claimed in claim 1, wherein the dimpling is at a point of the flow tube where a structure radially outwardly of the flow tube is less than about 0.125 inch from the flow tube.

5. The method as claimed in claim 4, wherein the structure is a seal.

6. The method as claimed in claim 1, wherein the change signature is a specified thermal signature.

7. The method as claimed in claim 1, wherein the change signature is a contact condition.

8. The method as claimed in claim 7, wherein the contact condition is an actuator chemical.

9. The method as claimed in claim 7, wherein the contact condition is pH.

10. The method as claimed in claim 1, wherein the dimpling physically prevents the flow tube from moving out of the interfering relationship with the flapper, thereby preventing flapper closure.

11. The method as claimed in claim 1, further including treating the flow tube to have a shape memory condition that is tubular.

12. A safety valve with temporary lock open construction comprising:
   a housing;
   a flapper articulated to the housing; and a flow tube including a shape memory material disposed in the housing and movable to a position where the flapper is closable and a position where the flapper is open.

13. The valve as claimed in claim 12, wherein the shape memory material makes up a portion of the flow tube located downstream of a structure of the housing that is within 0.125 inch radially of the flow tube.

14. The valve as claimed in claim 12, wherein the shape memory material is responsive to a shape change trigger to return to a nondeformed condition after deformation by a dimpling tool.

15. The valve as claimed in claim 14, wherein the shape change trigger is a thermal signature.

16. The valve as claimed in claim 14, wherein the shape change trigger is a chemical signature.

17. The valve as claimed in claim 14, wherein the shape change trigger is a pH signature.

18. A wellbore system, comprising:
a borehole in a subsurface formation;
a string in the borehole; and
a safety valve as claimed in claim 12 disposed within or as a part of the string.

* * * * *